(12) United States Patent
Zehler et al.

(10) Patent No.: US 9,706,064 B2
(45) Date of Patent: Jul. 11, 2017

(54) PAUSING PRINTING FOR PREVIEW OF DOCUMENTS PRINTED USING REMOTE SERVER-BASED PRINT QUEUES

(71) Applicant: Xerox Corporation, Norwalk, CT (US)

(72) Inventors: Peter J. Zehler, Penfield, NY (US); Lawrence W. Meyer, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/868,439

(22) Filed: Sep. 29, 2015

(65) Prior Publication Data

US 2017/0094075 A1    Mar. 30, 2017

(51) Int. Cl.
*G06F 15/00* (2006.01)
*H04N 1/00* (2006.01)
*G06F 3/12* (2006.01)

(52) U.S. Cl.
CPC ....... *H04N 1/00244* (2013.01); *G06F 3/1203* (2013.01); *G06F 3/126* (2013.01); *G06F 3/1247* (2013.01); *G06F 3/1256* (2013.01); *G06F 3/1261* (2013.01); *G06F 3/1268* (2013.01); *G06F 3/1285* (2013.01); *H04N 1/00408* (2013.01); *H04N 2201/0094* (2013.01)

(58) Field of Classification Search
CPC ........... H04N 1/00244; H04N 1/00408; H04N 2201/0094; G06F 3/1261; G06F 3/1268; G06F 3/1247; G06F 3/126; G06F 3/1285; G06F 3/1256; G06F 3/1203
See application file for complete search history.

(56) References Cited

U.S. PATENT DOCUMENTS

| | | | |
|---|---|---|---|
| 5,963,641 | A | 10/1999 | Crandall et al. |
| 5,995,719 | A | 11/1999 | Bourdead'hui et al. |
| 7,184,168 | B2 | 2/2007 | Beckman et al. |
| 7,375,835 | B1 | 5/2008 | Hull et al. |
| 7,451,140 | B2 | 11/2008 | Purvis et al. |
| 8,045,188 | B2 | 10/2011 | McCarthy et al. |
| 8,330,980 | B2 | 12/2012 | Sorrentino et al. |
| 8,441,660 | B2 | 5/2013 | Salgado |
| 8,537,392 | B2 | 9/2013 | d'Entrecasteaux |
| 8,559,033 | B2 | 10/2013 | Kohli et al. |
| 8,773,689 | B2 | 7/2014 | Kohli et al. |
| 2002/0131070 | A1 | 9/2002 | Housel et al. |

(Continued)

*Primary Examiner* — Helen Q Zong
(74) *Attorney, Agent, or Firm* — Gibb & Riley, LLC (57) ABSTRACT

A user interface receives instructions to retrieve a remote electronic document maintained within a print queue of an external server. A pause-and-reset print menu option is displayed on the user interface. Based on the user interface receiving selection of the pause-and-reset print menu option, printing the remote electronic document is begun and paused, to print a partially printed document. An inquiry regarding whether the partially printed document is acceptable is displayed on the user interface. Based on the user interface receiving input that the partially printed document is acceptable, the remainder of the remote electronic document is printed. Based on the user interface receiving input that the partially printed document is unacceptable, printing the remainder of the remote electronic document is canceled, and the print queue of the external server is reset to indicate that the remote electronic document has not been printed.

20 Claims, 7 Drawing Sheets

(56) References Cited

U.S. PATENT DOCUMENTS

| | | |
|---|---|---|
| 2004/0085560 A1 | 5/2004 | Stringham |
| 2005/0043844 A1 | 2/2005 | Wiechers et al. |
| 2009/0040541 A1* | 2/2009 | Maeda .................... B41J 3/407 |
| | | 358/1.9 |
| 2012/0194860 A1* | 8/2012 | Anno .................... B41J 29/393 |
| | | 358/1.15 |
| 2013/0321827 A1* | 12/2013 | Liebelt .................... H04N 1/60 |
| | | 358/1.9 |
| 2014/0055823 A1* | 2/2014 | Oishi ................ G06K 15/1892 |
| | | 358/3.28 |
| 2015/0045928 A1* | 2/2015 | Perez ................ B29C 67/0088 |
| | | 700/110 |
| 2015/0227333 A1* | 8/2015 | Tanaka .................. G06F 3/1267 |
| | | 358/1.15 |
| 2016/0127592 A1* | 5/2016 | Nakamura ......... H04N 1/00923 |
| | | 358/1.13 |

\* cited by examiner

Print Queue: PrintServer2237: /142  146

| File Name | Owner | Date |
|---|---|---|
| Sales003 | GFG | 01-07-2014 | Retrieve/Print 144 |
| PPT_ACC | PT | 05-27-2015 | Retrieve/Print 144 |
| BoardPres | BBN | 12-22-2014 | Retrieve/Print 144 |
| Quant_OWN | VLK | 07-07-2015 | Retrieve/Print 144 |
| 792AAB | 2998 | 10-29-2014 | Retrieve/Print 144 |
| DropFile38 | YYP | 11-02-2014 | Retrieve/Print 144 |
| Proj_2020 | UN | 07-18-2015 | Retrieve/Print 144 |

PAUSING PRINTING FOR PREVIEW OF DOCUMENTS PRINTED USING REMOTE SERVER-BASED PRINT QUEUES

BACKGROUND

Systems and methods herein generally relate to printing systems and more particularly to pausing printing for preview in remote server-based print queues.

Remote server-based print queues allow a user to submit a print job to a queue that can subsequently be printed using one of a large number of different printers. This allows a user to walk to any one of the supported printers and select the job to be printed. One of the issues with this approach is the incompatibility of the print ready document emitted by a print driver and some printers. Remote server-based print systems usually provide the capability for conversion to the print ready document format required by a specific printer. Often the configuration of the printer to which a print job can be sent is a manual step, which allows for the possibility of a mismatch that prevents usable output. When unusable output is produced, the user normally proceeds through the laborious task of resubmitting the job to the print queue, and prints using an alternate printer.

SUMMARY

Various methods herein receive, into a user interface operatively (meaning directly or indirectly) connected to a printing apparatus, instructions to retrieve a remote electronic document maintained within a print queue of an external server. In course, these methods retrieve the remote electronic document from the external server, using a print processor of the printing apparatus.

Such methods display a full-print menu option on the user interface to automatically print all pages of the remote electronic document as a fully printed document. These methods print the fully printed document using the printing engine, based on the user interface receiving selection of the full-print menu option. Additionally, the print processor removes the remote electronic document from the print queue of the external server after printing the fully printed document.

In addition, these methods display a pause-and-reset print menu option on the user interface. The pause-and-reset print menu option can be presented on the user interface before any printing of the remote electronic document and/or during any time when the remote electronic document is printing.

Based on the user interface receiving selection of the pause-and-reset print menu option, these methods begin printing the remote electronic document (using the printing apparatus) if such printing has not already started, and pause such printing of the remote electronic document, to print only a partially printed document. After pausing printing, such methods display (on the user interface) an inquiry regarding whether the partially printed document is acceptable.

Based on the user interface receiving input that the partially printed document is acceptable, the methods herein print the remainder of the remote electronic document using the printing apparatus. The processes of beginning printing the remote electronic document and printing the remainder of the remote electronic document prints only a single print job. After printing the remainder of the remote electronic document such methods removing the remote electronic document from the print queue of the external server. Additionally, other print requests can be printed using the printing apparatus between the time when the printing of the remote electronic document is paused and the time when the remainder of the remote electronic document is printed.

However, based on the user interface receiving input that the partially printed document is unacceptable, methods herein cancel printing the remainder of the remote electronic document and reset the print queue of the external server to indicate that the remote electronic document has not been printed.

Exemplary printing apparatuses herein include, among other components, a printing engine printing markings on sheets of print media, a print processor operatively connected to the printing engine, a user interface operatively connected to the print processor, a network connection operatively connected to the print processor, etc. The user interface receives instructions to retrieve a remote electronic document maintained within a print queue of an external server. The external server is connected to the network connection through an external computerized network. The print processor retrieves the remote electronic document from the external server through the network connection and the external network.

The user interface displays a full-print menu option to automatically print all pages of the remote electronic document as a fully printed document. The printing engine prints the fully printed document based on the user interface receiving selection of the full-print menu option. In addition, the user interface displays a pause-and-reset print menu option. The pause-and-reset print menu option can be presented on the user interface before any printing of the remote electronic document and/or during any printing of the remote electronic document.

Based on the user interface receiving selection of the pause-and-reset print menu option, the printing engine begins printing the remote electronic document (if such has not already started) and pauses such printing after printing less than all pages of the remote electronic document (to print a partially printed document). After the pausing printing, the user interface displays an inquiry regarding whether the partially printed document is acceptable.

The printing engine prints the remainder of the remote electronic document based on the user interface receiving input that the partially printed document is acceptable. The processes of printing the partially printed document and the printing of the remainder of the remote electronic document print only a single print job. In addition, the printing engine can print other print requests between pausing printing the remote electronic document and printing the remainder of the remote electronic document. Additionally, the print processor removes the remote electronic document from the print queue of the external server either after printing the fully printed document or after printing the remainder of the remote electronic document.

However, the print processor cancels printing of the remainder of the remote electronic document and resets the print queue of the external server (to indicate that the remote electronic document has not been printed) based on the user interface receiving input that the partially printed document is unacceptable.

Further, printing systems herein include, among other components, a printing apparatus operatively connected to a user interface, an external server operatively connected to the printing apparatus through a computerized network, etc. The user interface receives instructions to retrieve a remote electronic document maintained within a print queue of the external server. The printing apparatus retrieves the remote electronic document from the external server.

The user interface displays a full-print menu option to automatically print all pages of the remote electronic document as a fully printed document. The printing apparatus prints the fully printed document based on the user interface receiving selection of the full-print menu option. In addition, the user interface displays a pause-and-reset print menu option. The pause-and-reset print menu option can be presented on the user interface before any printing of the remote electronic document and/or during any printing of the remote electronic document.

Based on the user interface receiving selection of the pause-and-reset print menu option, the printing apparatus begins printing the remote electronic document (if such has not already started) and pauses such printing after printing less than all pages of the remote electronic document (to print a partially printed document). After the pausing printing, the user interface displays an inquiry regarding whether the partially printed document is acceptable.

The printing apparatus prints the remainder of the remote electronic document based on the user interface receiving input that the partially printed document is acceptable. The processes of printing the partially printed document and the printing of the remainder of the remote electronic document print only a single print job. In addition, the printing apparatus can print other print requests between pausing printing the remote electronic document and printing the remainder of the remote electronic document. Additionally, the printing apparatus removes the remote electronic document from the print queue of the external server either after printing the fully printed document or after printing the remainder of the remote electronic document.

However, the printing apparatus cancels printing of the remainder of the remote electronic document and resets the print queue of the external server (to indicate that the remote electronic document has not been printed) based on the user interface receiving input that the partially printed document is unacceptable.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, often the configuration of a printer to which a print job can be sent is a manual step, which allows for the possibility of a mismatch that prevents unusable output. Therefore, the systems and methods herein pause after printing initial pages of a print job prior to releasing the remainder of the print job. Rather than resorting to a separate proof print job, the systems and methods herein pause after printing initial pages of a print job using the same user interface that is used for printing from an external server. If the printout is acceptable, the remainder of the print job is released. If the printout is unacceptable, the print job is reset in the pending state in the queue so that it can be released on another printer.

Figure 1:
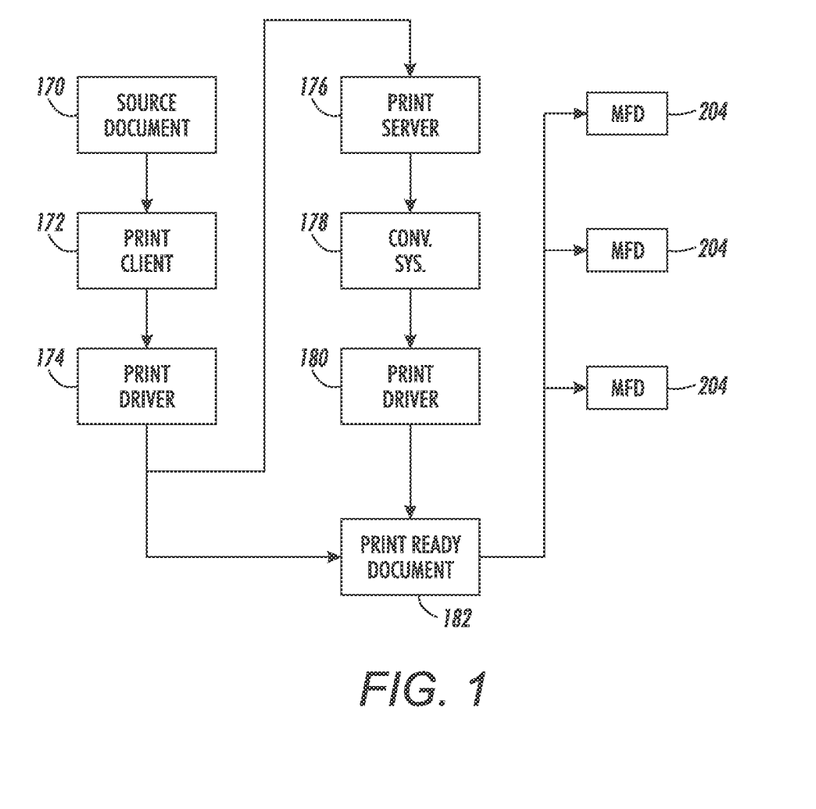
FIG. 1 is a schematic diagram of various systems and methods herein.

As shown in FIG. 1, exemplary systems include a print client 172 (which can be a mobile client, desktop client, email client, etc.). The print client 172 submits jobs using a print server 176. The print client 172 may have a driver 174 that converts source documents 170 to print ready documents 182. The source document 170 can be, for example, a .pdf file, .doc file, .jpeg picture, .txt file, etc., that the user wishes to print, while the print ready document 182 is a rasterized document (e.g., bitmap document) or printer specific document that printer can print without further processing. The print server 176 accepts the print job from the print client 172, and the print job is queued until the user requests the job be printed at a specific printer or multi-function device (MFD) 204 (the detailed of which is discussed in detail below). The print server 176 may have a driver 180 that converts source documents 170 to print ready documents 182 or one print ready document to another. The print server 176 arranges for the source document 170 to be converted to an appropriate print ready document 182 for the selected printer 204.

Thus, the print server 176 is configured to allow a set of users to print at a number of printers 204. The capabilities of each printer 204 are obtained and the printers 204 are configured into pull groups and associated with a conversion subsystem 178 and driver 180. The input channels (i.e., print clients 172 and associated queues) are mapped to pull groups. A print client 172 is installed on a user's device, and the end user uses the device to submit a job to the print server 176. The end user selects a source document 170, and the end user specifies the production intent (e.g., number of copies, media size). The print client 172 sends a print job request that includes the print job metadata, including end user information, to the print server 176. The end user is optionally provided with, or specified, a password or personal identification number (PIN) that can be used at any of the printers 204 to cause the print job output to be printed there, and the document content is held pending instructions from the print server 176.

Once the print server 176 has a job request, the job can be displayed on the printer's 204 corresponding user interface. An authenticated user can select their print job from the user interface. Thus, the user can simply release their print job, or alternatively the user can select to preview some number of pages of the print job. Once the preview has been printed, the user is prompted for printout approval. If the user approves, the entire job is released. If the user does not approve, the job state is reset to 'pending' and the user may repeat the process at an alternate printer 204.

Thus, systems and methods herein validate that the printout is as intended before releasing remainder of the job (without requiring a proof print job that is separate from the print job itself), and print jobs that do not print correctly on one printer can be tried on another without print job resubmission to the queue.

Figure 2:
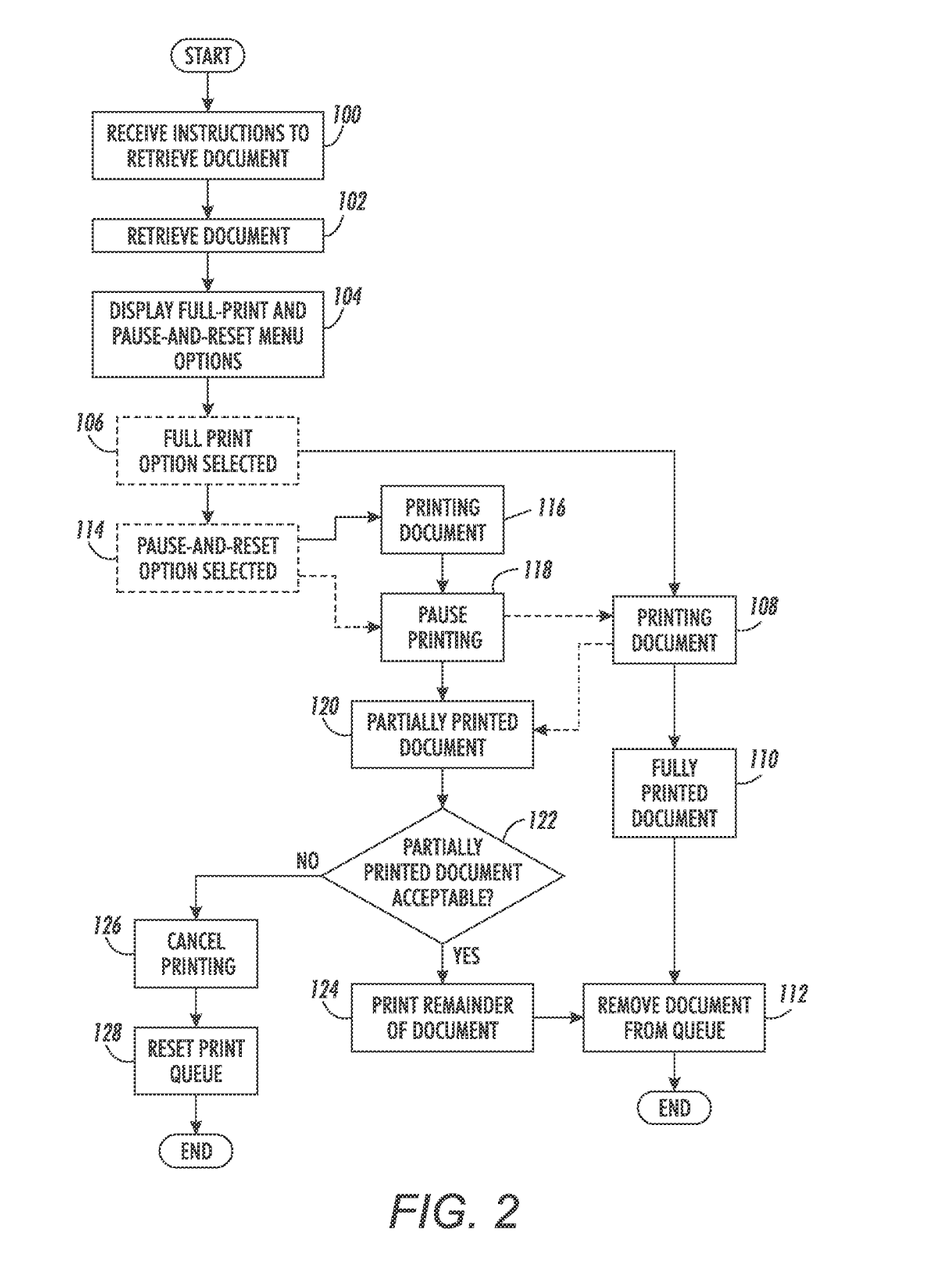
FIG. 2 is a flow diagram of various methods herein.

FIG. 2 is flowchart illustrating exemplary methods herein. Note that some of the processing that may optionally occur (based upon user input) is shown using dashed lines in FIG. 2. After start, in item 100 these methods receive, into a user interface operatively connected to a printing apparatus, instructions to retrieve a remote electronic document maintained within a print queue of an external server.

Figure 3:
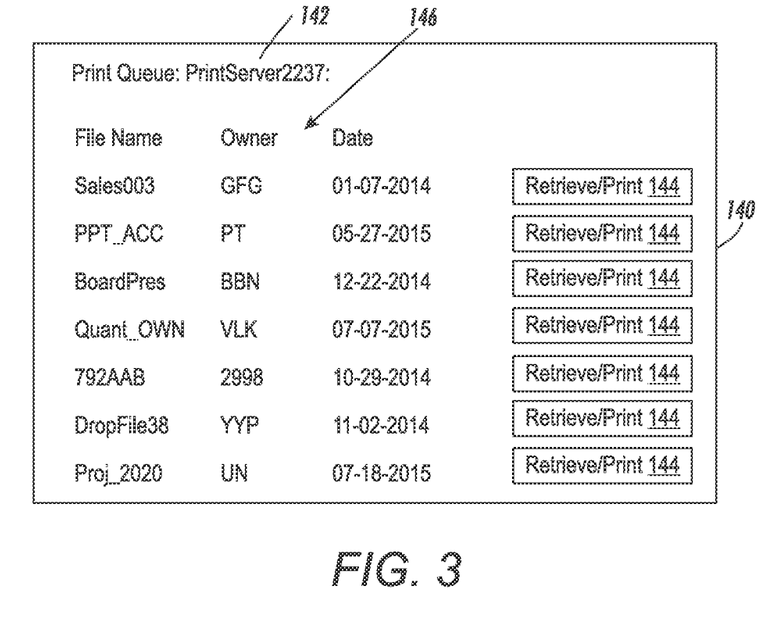
FIG. 3 is a schematic diagram of a screen that can be presented on a user interface by systems and methods herein.

For example, as shown in FIG. 3, systems and methods herein present a screen 140 to the user through the graphic user interface. This screen includes an identification of the remote computerized server that maintains the print queue (142) and also lists out various details of the different files that are available for download and printing (146). Such file details 146 include items as the filename, the owner of the file, the date the file was last modified, etc., although those ordinarily skilled in the art what understand that many other items relating to the print queue could be provided through the graphic user interface. In addition, the screen 140 includes any form of menu selection input whether currently known or developed in the future, such as radio style buttons 144, the selection of which instructs the printing device to request download of the file, and to begin the process of printing the file.

Therefore, user selection of one of the radio buttons 144, instructs the systems and methods herein to retrieve one of the remote electronic documents 146 maintained within a print queue of the external server 142 (as also shown in item 100 in FIG. 2). The systems and methods herein follow that instruction input into the graphic user interface by the user and, as shown in item 102 in FIG. 2, these methods retrieve the remote electronic document from the external server (e.g., using a print processor of the printing apparatus).

Figure 4:
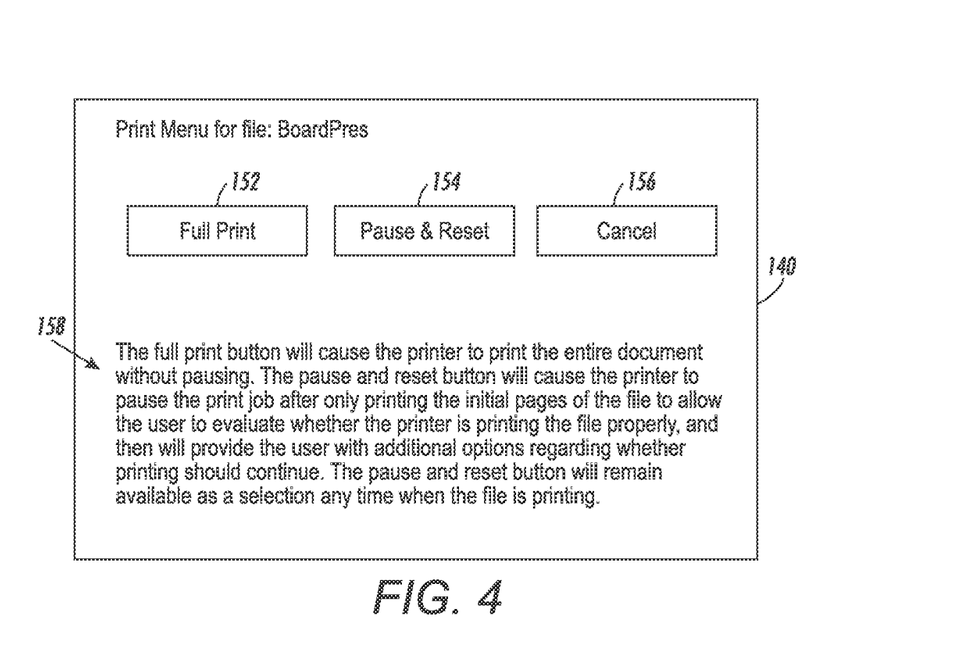
FIG. 4 is a schematic diagram of a screen that can be presented on a user interface by systems and methods herein.

As shown in item 104 in FIG. 2, such methods display a full-print menu option and a pause-and-reset print menu option on the user interface. For example, one exemplary screen 150 is shown in FIG. 4 (although those skilled in the art would understand that any other form of display could be utilized and that FIG. 4 is merely one of many different possible examples). More specifically, as shown in FIG. 4, item 150 is a screen that presents a print menu for one of the files (BoardPres) that could have been selected by the user for retrieval and printing (e.g., using button 144) from the print queue 140 shown in FIG. 3.

As also shown in FIG. 4, additional menu selection items (which again are arbitrarily shown as radio buttons, but could comprise any form of menu selection feature) include a full-print option 152, a pause-and-reset option 154, and a cancel option 156. The cancel option 156 takes the user back to the print queue shown in FIG. 3, for example. In addition, notes 158 can be provided to the user to advise them of the operations that will occur for each of the different menu selections. The notes 158 may be always present on the screen 150, or may only appear when the user hovers the cursor over a specific radio button. Therefore, the notes 158 can be context sensitive.

In the specific example shown in FIG. 4, the notes 158 can explain that the full-print button will cause the printer to print the entire document without pausing, and that the pause-and-reset button will cause the printer to pause the print job after only printing the initial pages of the file to allow the user to evaluate whether the printer is printing the file properly, and then will provide the user with additional options regarding whether printing should continue. The notes 158 can also advise the user that the pause-and-reset print menu option 154 will remain any time when the remote electronic document is printing. In other words, the pause-and-reset print menu option 154 can be presented on the user interface before any printing of the remote electronic document and/or during any time when the remote electronic document is printing.

Item 106 in FIG. 2 shows that the user interface receives selection of the full-print menu option 152 (e.g., the user provides input to the user interface selecting the full-print menu option 152). Selection of the full-print menu option 152 causes the printing apparatus to automatically print all pages of the remote electronic document as a fully printed document, without pausing. As discussed in detail below, item 118 may pause the printing occurring in item 108. However, if item 118 does not pause the printing occurring in item 108, the results of item 108 are a fully printed document shown as item 110.

Therefore, item 108 in FIG. 2 illustrates that these methods print the fully printed document 110 using the printing engine (based on the user interface receiving selection of the full-print menu option in item 106). After the fully printed document 110 is output, processing proceeds to item 112, where the print processor automatically removes the remote electronic document from the print queue of the external server 142 (which ends processing for these methods). In other words, in item 112 the processor of the printing device transmits a message to the print server that maintains the print queue, and such a message indicates that the document has been fully printed, which allows the print server to either mark the document as being released or fully printed, remove the document from the print queue, or take any other action corresponding to a document that has been previously printed.

As noted above, instead of (or after) selecting the full-print menu option 152, the user may select the pause-and-reset button 154 shown in FIG. 4. Therefore, based on the user interface receiving selection of the pause-and-reset print menu option in item 114 in FIG. 2, these methods begin printing the remote electronic document (in item 116) if such printing has not already started in item 108. Further, selection of the pause-and-reset print menu option in item 114 results in these methods pausing the printing of the remote electronic document in item 118 (which may be occurring in items 108 or 116) so as to print only a partially printed document 120 (e.g., only the first 3 pages of a 10 page document).

The number of pages of the remote electronic document that are printed before item 118 pauses the printing (which is always less than a total number of pages in the remote electronic document) can be established in a number of different ways. In one example, the systems and methods herein can utilize a fixed page count (e.g., two pages, four pages, etc.) after which printing is paused. In another alternative, printing can be paused in item 118 after a certain percentage of the pages of the remote electronic document are printed (e.g. 10%, 20%, etc., of the full page count of the remote electronic document). Additionally, if the pause-and-reset menu option 154 is selected after the full-print menu option 152 has been selected (and printing is occurring in item 108 in FIG. 2) printing can be paused by item 118 immediately upon execution of the pause-and-reset menu option 154. While a limited number of processes for determining when the printing will pause in item 118 are presented here, those ordinarily skilled in the art would understand that many other processes could be utilized to determine when to pause printing.

Figure 5:
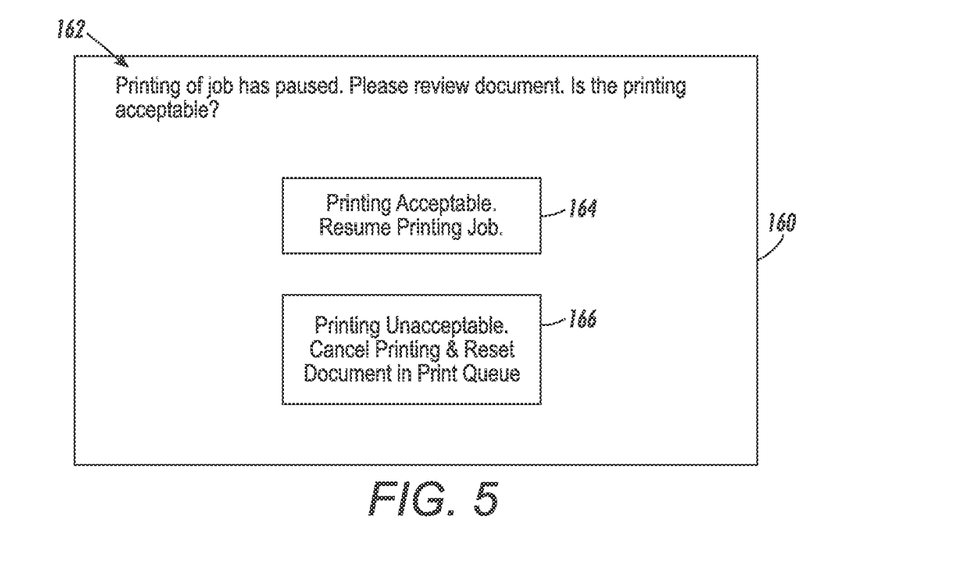
FIG. 5 is a schematic diagram of a screen that can be presented on a user interface by systems and methods herein.

After pausing printing in item 118, such methods display (on the user interface) an inquiry regarding whether the partially printed document 120 is acceptable, as shown by decision box 122. For example, one exemplary screen 160 that could be presented to the user is shown in FIG. 5. As shown in FIG. 5, the screen 160 can present a message to the user that the printing of the job has paused. As also shown an item 162, the user can be requested to review the document and determine whether the partially printed document is acceptable.

Systems and methods herein present various menu options to the user regarding whether the printing of the partially printed document 120 is acceptable. For example, in FIG. 5, such menu options can again be presented as radio buttons (however, again any form of menu selection can be provided to the user). One of the radio buttons allows the user to indicate that printing is acceptable, and that the printing of the print job should resume (radio button 164). Another menu option allows the user to indicate that the printing is unacceptable and that printing should be canceled and the document in the print queue should be reset (radio button 166).

In one example, the user may select the "printing acceptable" radio button 164 and, therefore, based on the user interface receiving input that the partially printed document is acceptable (a "yes" decision in box 122 shown in FIG. 2), the methods herein print the remainder of the remote electronic document using the printing apparatus, as shown in item 124. Processing then again proceeds to item 112 to remove the documents from the print queue (as discussed above) after which processing ends.

For purposes herein the "remainder" of the remote electronic document can simply be the remaining pages that were not printed because item 118 paused printing that was occurring in items 108 or 116. Thus, if the first 3 pages of a 10 page document were printed as the partially printed document 120, the remaining 7 pages of that 10 page document would be printed as the remainder of the document in item 124. Therefore, the processes of beginning printing the remote electronic document (108 or 116) and printing the remainder of the remote electronic document (124) print only a single print job, even though the single print job maybe paused temporarily by item 118.

As additional alternatives, the systems and methods herein may not necessarily print the first few pages of a print job. Instead, the last few pages of the print job (e.g., pages 8-10 of a 10 page print job) can be printed as the partially printed document 120, wherein the remaining previous pages (e.g., pages 1-7 of the 10 page print job) can be printed as the remainder in item 124. Similarly, in other alternatives, sample pages (e.g., pages 1, 5, 10, etc.) can be printed as the partially printed document 120; and, in such a situation, the printing of the remainder of the document in item 124 would print the document from beginning to end, skipping the pages that have been previously printed. These are merely some of the examples of the different pages that can be printed before and after printing is paused in item 118 by systems and methods herein; however, those ordinarily skilled in the art would understand that many different combinations of pages could be printed as the partially printed document 120 and the remainder of the document printed in item 124. Again, with systems and methods herein, printing of a single print job is merely paused (and multiple print jobs (or additional separate proof jobs) are not created with such processing). Therefore, part of the printing of the single print job occurs before printing is paused in item 118, and the remainder of that same single print job is printed as the remainder in item 124.

Additionally, to increase machine utilization and efficiency, other print requests can be printed using the printing apparatus between the time when the printing of the remote electronic document is paused in item 118, and the time when the remainder of the remote electronic document is printed in item 124. In such situations, the printing machine maintains the single print job in a paused state in memory until the user returns (and potentially logs back in), at which point the user can be presented with the menu items shown in FIG. 5, and processing can resume beginning with item 122 shown in FIG. 2.

As noted above, the user may alternatively select menu option 166 (shown in FIG. 5) indicating that the printing is unacceptable. Therefore, based on the user interface receiving input that the partially printed document is unacceptable (a "no" in item 122 in FIG. 2) methods herein cancel printing of the remainder of the remote electronic document 126 (e.g., do not print any more pages of the remote electronic document) and reset the print queue of the external server to indicate that the remote electronic document has not been printed 128, after which processing ends.

More specifically, in item 128, the systems and methods herein cause the print processor to send a transmission to the print server to maintain the remote electronic document in the print queue as being available for printing (as shown in FIG. 3). Thus, after processing in item 128, the same remote electronic document is shown in the print queue (e.g., FIG. 3) as being available for printing. Various print queues maintain documents differently; however, regardless of how a remote electronic document may appear in a given print queue, after the processing in item 128, the remote electronic document is available for printing (on the same printer, or another printer). Therefore, after processing in item 128, the user may use a different printer and select for printing the same remote electronic document that was printing in an unacceptable manner on a previous printer. This allows the user to effortlessly begin printing the remote electronic document on a different printer (if the printing of the partially printed document 120 was unacceptable on the previous printer) without requiring the user to reload the remote electronic document into the print queue of the remote server.

Figure 6:
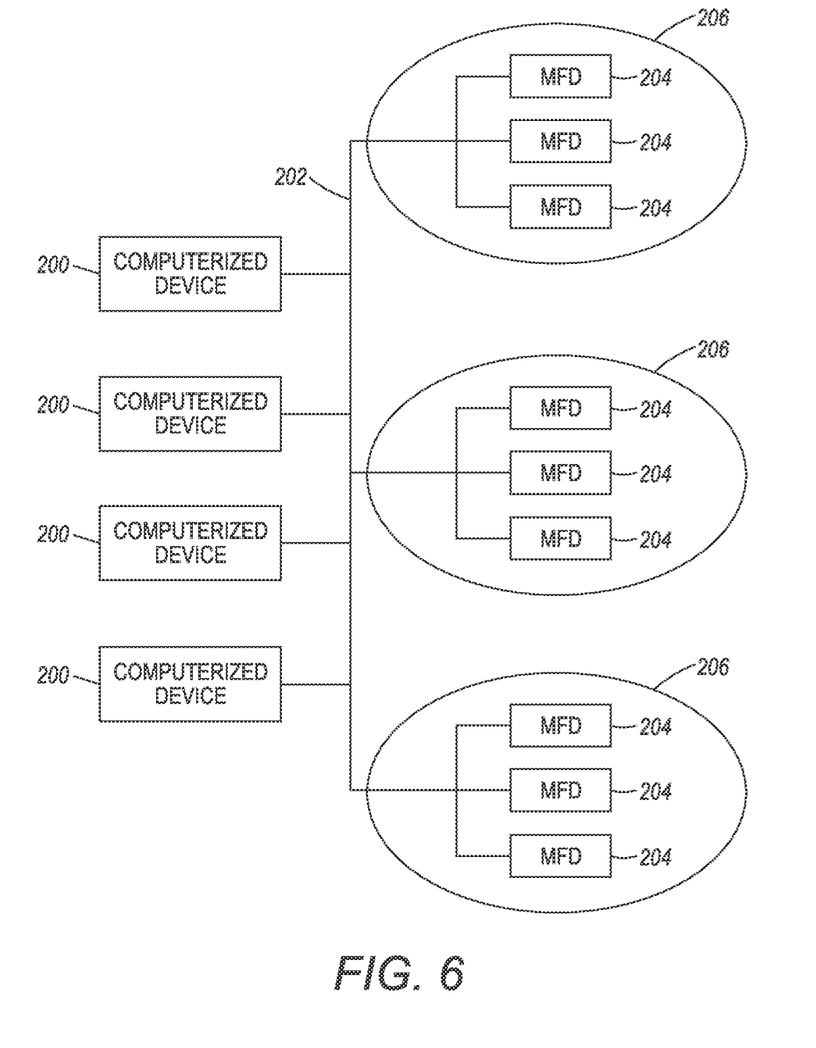
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
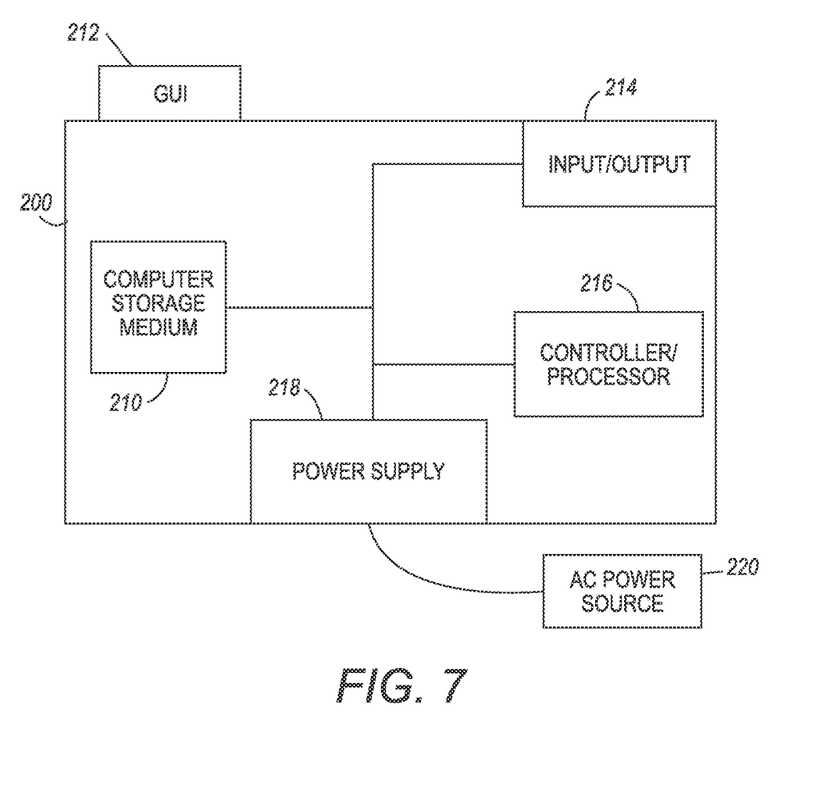
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 7, a body housing has one or more functional components that operate on power supplied from an alternating current (AC) source 220 by the power supply 218. The power supply 218 can comprise a common power conversion unit, power storage element (e.g., a battery, etc), etc.

Figure 8:
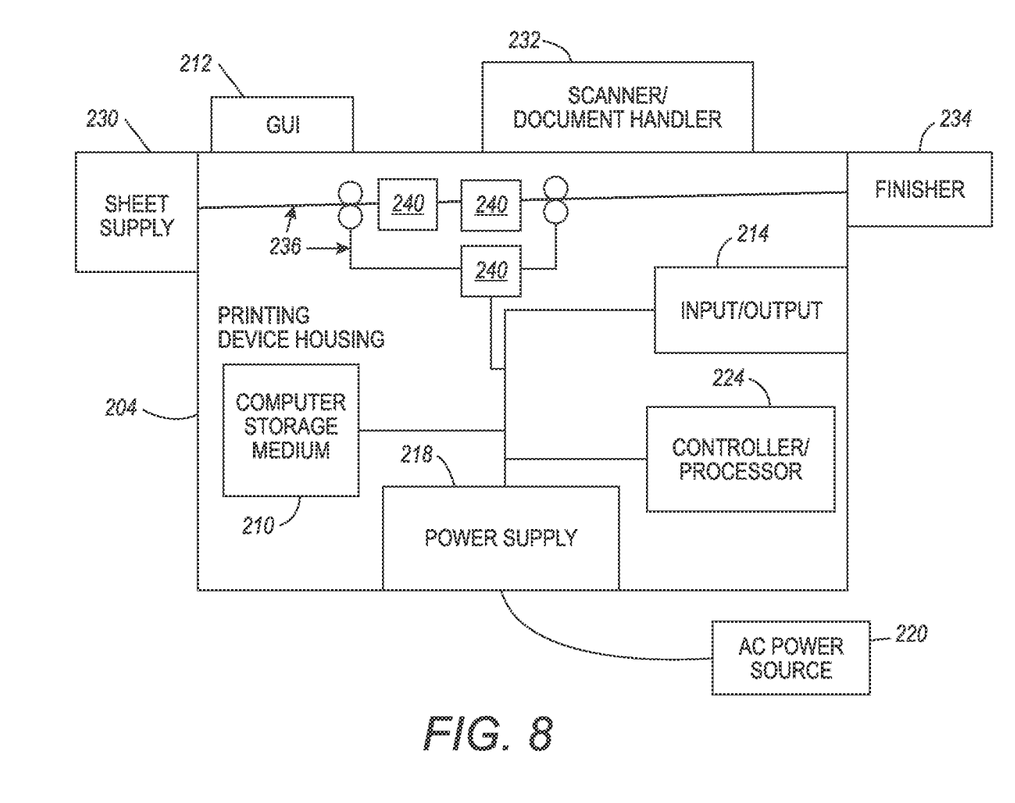
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt or devices that print directly to print media (e.g., inkjet printers, ribbon-based contact printers, etc.).

Therefore, as shown above, exemplary printing apparatuses 204 herein include, among other components, a printing engine 240 printing markings on sheets of print media, a print processor 224 operatively (meaning directly or indirectly) connected to the printing engine 240, a user interface 212 operatively connected to the print processor 224, a network connection 214 operatively connected to the print processor 224, etc. The user interface 212 receives instructions to retrieve a remote electronic document maintained within a print queue of an external server 200. The external server 200 is connected to the network connection 214 through an external computerized network 202. The print processor 224 retrieves the remote electronic document from the external server 200 through the network connection 214 and the external network 202.

The user interface 212 displays a full-print menu option to automatically print all pages of the remote electronic document as a fully printed document. The printing engine 240 prints the fully printed document based on the user interface 212 receiving selection of the full-print menu option. In addition, the user interface 212 displays a pause-and-reset print menu option. The pause-and-reset print menu option can be presented on the user interface 212 before any printing of the remote electronic document and/or during any printing of the remote electronic document.

Based on the user interface 212 receiving selection of the pause-and-reset print menu option, the printing engine 240 begins printing the remote electronic document (if such has not already started) and pauses such printing after printing less than all pages of the remote electronic document (to print a partially printed document). After the pausing printing, the user interface 212 displays an inquiry regarding whether the partially printed document is acceptable.

The printing engine 240 prints the remainder of the remote electronic document based on the user interface 212 receiving input that the partially printed document is acceptable. The processes of printing the partially printed document and the printing of the remainder of the remote electronic document print only a single print job. In addition, the printing engine 240 can print other print requests between pausing printing the remote electronic document and printing the remainder of the remote electronic document. Additionally, the print processor 224 removes the remote electronic document from the print queue of the external server 200 either after printing the fully printed document or after printing the remainder of the remote electronic document.

However, the print processor 224 cancels printing of the remainder of the remote electronic document and resets the print queue of the external server 200 (to indicate that the remote electronic document has not been printed) based on the user interface 212 receiving input that the partially printed document is unacceptable.

Further, printing systems herein include, among other components, a printing apparatus 204 operatively connected to a user interface 212, an external server 200 operatively connected to the printing apparatus 204 through a computerized network 202, etc. The user interface 212 receives instructions to retrieve a remote electronic document maintained within a print queue of the external server 200. The printing apparatus 204 retrieves the remote electronic document from the external server 200.

The user interface 212 displays a full-print menu option to automatically print all pages of the remote electronic document as a fully printed document. The printing apparatus 204 prints the fully printed document based on the user interface 212 receiving selection of the full-print menu option. In addition, the user interface 212 displays a pause-and-reset print menu option. The pause-and-reset print menu option can be presented on the user interface 212 before any printing of the remote electronic document and/or during any printing of the remote electronic document.

Based on the user interface 212 receiving selection of the pause-and-reset print menu option, the printing apparatus 204 begins printing the remote electronic document (if such has not already started) and pauses such printing after printing less than all pages of the remote electronic document (to print a partially printed document). After the pausing printing, the user interface 212 displays an inquiry regarding whether the partially printed document is acceptable.

The printing apparatus 204 prints the remainder of the remote electronic document based on the user interface 212 receiving input that the partially printed document is acceptable. The processes of printing the partially printed document and the printing of the remainder of the remote electronic document print only a single print job. In addition, the printing apparatus 204 can print other print requests between pausing printing the remote electronic document and printing the remainder of the remote electronic document. Additionally, the printing apparatus 204 removes the remote electronic document from the print queue of the external server 200 either after printing the fully printed document or after printing the remainder of the remote electronic document.

However, the printing apparatus 204 cancels printing of the remainder of the remote electronic document and resets the print queue of the external server 200 (to indicate that the remote electronic document has not been printed) based on the user interface 212 receiving input that the partially printed document is unacceptable.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing apparatus comprising:
    a printing engine;
    a print processor operatively connected to said printing engine; and
    a user interface operatively connected to said print processor,
    said user interface receiving instructions to retrieve a remote electronic document maintained within a print queue of an external server,
    said user interface displaying a full-printing menu option and a second printing menu option,
    based on said user interface receiving selection of said full-printing menu option, said printing engine printing all of said remote electronic document without pausing to print a fully printed document, and
    based on said user interface receiving selection of said second printing menu option:
        said printing engine beginning printing sample pages of said remote electronic document and pausing printing said remote electronic document to print a partially printed document, said sample pages comprising non-consecutive pages of said remote electronic document appearing at various locations within said remote electronic document;
        said user interface displaying an inquiry regarding whether said partially printed document is acceptable after said pausing printing;
        said printing engine printing a remainder of said remote electronic document based on said user interface receiving input that said partially printed document is acceptable, said remainder comprising all pages of said remote electronic document other than said sample pages; and
        said print processor canceling printing said remainder of said remote electronic document and resetting said print queue of said external server to indicate that said remote electronic document has not been printed, based on said user interface receiving input that said partially printed document is unacceptable.

2. The printing apparatus according to claim 1, said printing engine printing other print requests between said pausing printing said remote electronic document and said printing said remainder of said remote electronic document.

3. The printing apparatus according to claim 1, said beginning printing said remote electronic document and said printing said remainder of said remote electronic document comprising printing a single print job.

4. The printing apparatus according to claim 1, said sample pages comprising a last page of said remote electronic document.

5. The printing apparatus according to claim 1, said sample pages comprising pages from a beginning, middle, and end of said remote electronic document.

6. A printing apparatus comprising:
    a printing engine printing markings on sheets of print media;
    a print processor operatively connected to said printing engine;
    a user interface operatively connected to said print processor; and
    a network connection operatively connected to said print processor,
    said user interface receiving instructions to retrieve a remote electronic document maintained within a print queue of an external server,
    said external server being connected to said network connection through an external computerized network,
    said print processor retrieving said remote electronic document from said external server,
    said user interface displaying a full-printing menu option to automatically print all pages of said remote electronic document as a fully printed document, based on said user interface receiving selection of said
full-printing menu option, said printing engine printing
said fully printed document without pausing,
said user interface displaying a second printing menu
option, and
based on said user interface receiving selection of said
second printing menu option:
said printing engine beginning printing sample pages of
said remote electronic document and pausing printing said remote electronic document after printing
less than all pages of said remote electronic document to print a partially printed document, said
sample pages comprising non-consecutive pages of
said remote electronic document appearing at various locations within said remote electronic document;
said user interface displaying an inquiry regarding
whether said partially printed document is acceptable after said pausing printing;
said printing engine printing a remainder of said remote
electronic document based on said user interface
receiving input that said partially printed document
is acceptable, said remainder comprising all pages of
said remote electronic document other than said
sample pages; and
said print processor canceling printing said remainder
of said remote electronic document and resetting said
print queue of said external server to indicate that
said remote electronic document has not been
printed, based on said user interface receiving input
that said partially printed document is unacceptable.

7. The printing apparatus according to claim 6, said printing engine printing other print requests between said pausing printing said remote electronic document and said printing said remainder of said remote electronic document.

8. The printing apparatus according to claim 6, said beginning printing said remote electronic document and said printing said remainder of said remote electronic document comprising printing a single print job.

9. The printing apparatus according to claim 6, said sample pages comprising a last page of said remote electronic document.

10. The printing apparatus according to claim 6, said sample pages comprising pages from a beginning, middle, and end of said remote electronic document.

11. A printing system comprising:
a printing apparatus operatively connected to a user interface; and
an external server operatively connected to said printing apparatus through a computerized network,
said user interface receiving instructions to retrieve a remote electronic document maintained within a print queue of said external server,
said user interface displaying a full-printing menu option and a second printing menu option,
based on said user interface receiving selection of said full-printing menu option, said printing apparatus printing all of said remote electronic document without pausing to print a fully printed document,
based on said user interface receiving selection of said second printing menu option:
said printing apparatus beginning printing sample pages of said remote electronic document and pausing printing said remote electronic document to print a partially printed document, said sample pages comprising non-consecutive pages of said remote electronic document appearing at various locations within said remote electronic document;
said user interface displaying an inquiry regarding whether said partially printed document is acceptable after said pausing printing;
said printing apparatus printing a remainder of said remote electronic document based on said user interface receiving input that said partially printed document is acceptable, said remainder comprising all pages of said remote electronic document other than said sample pages; and
said printing apparatus canceling printing said remainder of said remote electronic document and resetting said print queue of said external server to indicate that said remote electronic document has not been printed, based on said user interface receiving input that said partially printed document is unacceptable.

12. The printing system according to claim 11, said printing apparatus printing other print requests between said pausing printing said remote electronic document and said printing said remainder of said remote electronic document.

13. The printing system according to claim 11, said beginning printing said remote electronic document and said printing said remainder of said remote electronic document comprising printing a single print job.

14. The printing system according to claim 11, said sample pages comprising a last page of said remote electronic document.

15. The printing system according to claim 11, said sample pages comprising pages from a beginning, middle, and end of said remote electronic document.

16. A method comprising:
receiving, into a user interface operatively connected to a printing apparatus, instructions to retrieve a remote electronic document maintained within a print queue of an external server;
displaying a full-printing menu option and a second printing menu option on said user interface;
based on said user interface receiving selection of said full-printing menu option, printing all of said remote electronic document using said printing apparatus without pausing to print a fully printed document; and
based on said user interface receiving selection of said second printing menu option:
beginning printing sample pages of said remote electronic document using said printing apparatus and pausing printing said remote electronic document to print a partially printed document, said sample pages comprising non-consecutive pages of said remote electronic document appearing at various locations within said remote electronic document;
displaying an inquiry regarding whether said partially printed document is acceptable on said user interface after said pausing printing;
printing a remainder of said remote electronic document using said printing apparatus based on said user interface receiving input that said partially printed document is acceptable, said remainder comprising all pages of said remote electronic document other than said sample pages; and
canceling printing said remainder of said remote electronic document and resetting said print queue of said external server to indicate that said remote electronic document has not been printed, based on said user interface receiving input that said partially printed document is unacceptable.

17. The method according to claim 16, further comprising printing other print requests between said pausing printing said remote electronic document and said printing said remainder of said remote electronic document using said printing apparatus.

18. The method according to claim 16, said beginning printing said remote electronic document and said printing said remainder of said remote electronic document comprising printing a single print job.

19. The method according to claim 16, said sample pages comprising a last page of said remote electronic document.

20. The method according to claim 16, said sample pages comprising pages from a beginning, middle, and end of said remote electronic document.

* * * * *